(12) United States Patent
Field (10) Patent No.: US 12,210,371 B2
(45) Date of Patent: Jan. 28, 2025

(54) SINGLE-CLOCK INSERTION SORT SCHEME

(71) Applicant: L3Harris Technologies, Inc., Melbourne, FL (US)

(72) Inventor: Michael Field, Huntington Beach, CA (US)

(73) Assignee: L3Harris Technologies, Inc., Melbourne, FL (US)

( * ) Notice: Subject to any disclaimer, the term of this patent is extended or adjusted under 35 U.S.C. 154(b) by 91 days.

(21) Appl. No.: 18/172,582

(22) Filed: Feb. 22, 2023

(65) Prior Publication Data

US 2024/0281020 A1    Aug. 22, 2024

(51) Int. Cl.
 *G06F 1/04* (2006.01)
 *G06F 7/24* (2006.01)

(52) U.S. Cl.
 CPC . *G06F 1/04* (2013.01); *G06F 7/24* (2013.01)

(58) Field of Classification Search
 CPC .................................... G06F 1/04; G06F 7/24
 See application file for complete search history.

(56) References Cited

U.S. PATENT DOCUMENTS

| | | | | |
|---|---|---|---|---|
| 5,222,243 A | * | 6/1993 | Briggs | G06F 7/24 712/300 |
| 11,593,106 B1 | * | 2/2023 | Yeung | G06F 9/30036 |
| 2003/0123418 A1 | * | 7/2003 | Buchert | H04J 3/047 370/337 |
| 2012/0054207 A1 | * | 3/2012 | Vermeulen | G06F 7/544 707/E17.104 |
| 2018/0309697 A1 | * | 10/2018 | Sarais | G06F 7/24 |

* cited by examiner

*Primary Examiner* — Glenn A. Auve
(74) *Attorney, Agent, or Firm* — Edell, Shapiro & Finnan, LLC (57) ABSTRACT

A sorting circuit includes: a stack of registers for storing a set of data values from a highest value to a lowest value; a set of comparators for substantially simultaneously comparing an input data value to the set of data values stored in the registers, where the comparators enable registers whose stored data values are less than the input data values to receive a replacement data value; and a set of multiplexers, each associated with a register in the stack to select the replacement data value when the register is enabled. The multiplexer selects the input data value to be the replacement data value if the register is the highest register in the stack currently storing a data value that is less than the input data value. Otherwise, the multiplexer selects the data value stored in the next-highest register in the stack to be the replacement data value.

20 Claims, 5 Drawing Sheets

SINGLE-CLOCK INSERTION SORT SCHEME

GOVERNMENT LICENSE RIGHTS

This invention was made with the support of the U.S. Government, and the U.S. Government has certain rights in the invention.

TECHNICAL FIELD

The present disclosure relates generally to a scheme for performing an insertion sorting algorithm in a single clock cycle of a circuit and a method of performing an insertion sort.

BACKGROUND

Insertion sorting algorithms involve arranging items in an ordered set by comparing attributes or values of the items to determine the relative position of the items in the ordered set. For example, a set of data values can be ordered in an array, list, or "stack" according to their magnitude, with the highest value at one end of the array and proceeding with successively lower values to a lowest value at the other end of the array. Each data value in the set can be sorted to the correct position in the ordered sequence of the array by comparing its magnitude to the magnitudes of data values already sorted in the array.

Insertion sorting is useful in a wide variety of applications, including those where identifying certain data values of specific relative magnitudes within a data set is required. For example, some applications may involve identifying one or several highest or peak values or minimum values within a data set. In digital signal processing, rapid sorting of binary values is often needed. This is especially true of spread spectrum navigation and communications systems where the peaks of multiple time taps and frequency bin values integrated over a period of time need to pass a threshold and then be ordered for further processing.

For moderately sized data sets, insertion sorting can be efficient, particularly where new data values need to be sorted into an existing set of already-sorted data values. However, performing insertion sorting by executing instructions on a processor (i.e., in software) can be relatively time-consuming owing to the requirement of performing numerous operations, including the compare operations, to effect each sort. To perform higher-speed insertion sorting, such as sorting a sequential stream of data values in real time, a faster, simpler, and more efficient solution is required, ideally involving a single-clock hardware architecture with a low gate count, low power requirements, and minimal combinatorial delays to enable a high clock rate.

DESCRIPTION OF EXAMPLE EMBODIMENTS

Overview

In an embodiment, a sorting circuit comprises an input circuit to receive a sequence of data values and a set of stages in a stack to store data values in order of magnitude from a highest value stored in a highest stage of the stack to a lowest value stored in a lowest stage of the stack. Individual stages include: a register to store a data value; a comparator to determine whether an input data value received from the input circuit is greater than the stored data value currently stored in the register, where an output of the comparator enables the register to store a replacement data value in response to the input data value being greater than the stored data value; and a multiplexer to select the replacement data value to be supplied to the register in response to the register being enabled by the comparator. The replacement data value is selected based on an output of the comparator of the next-highest stage in the stack as either the input data value or the next-highest stored data value currently stored in the register of the next-highest stage in the stack.

Example Embodiments

Figure 1:
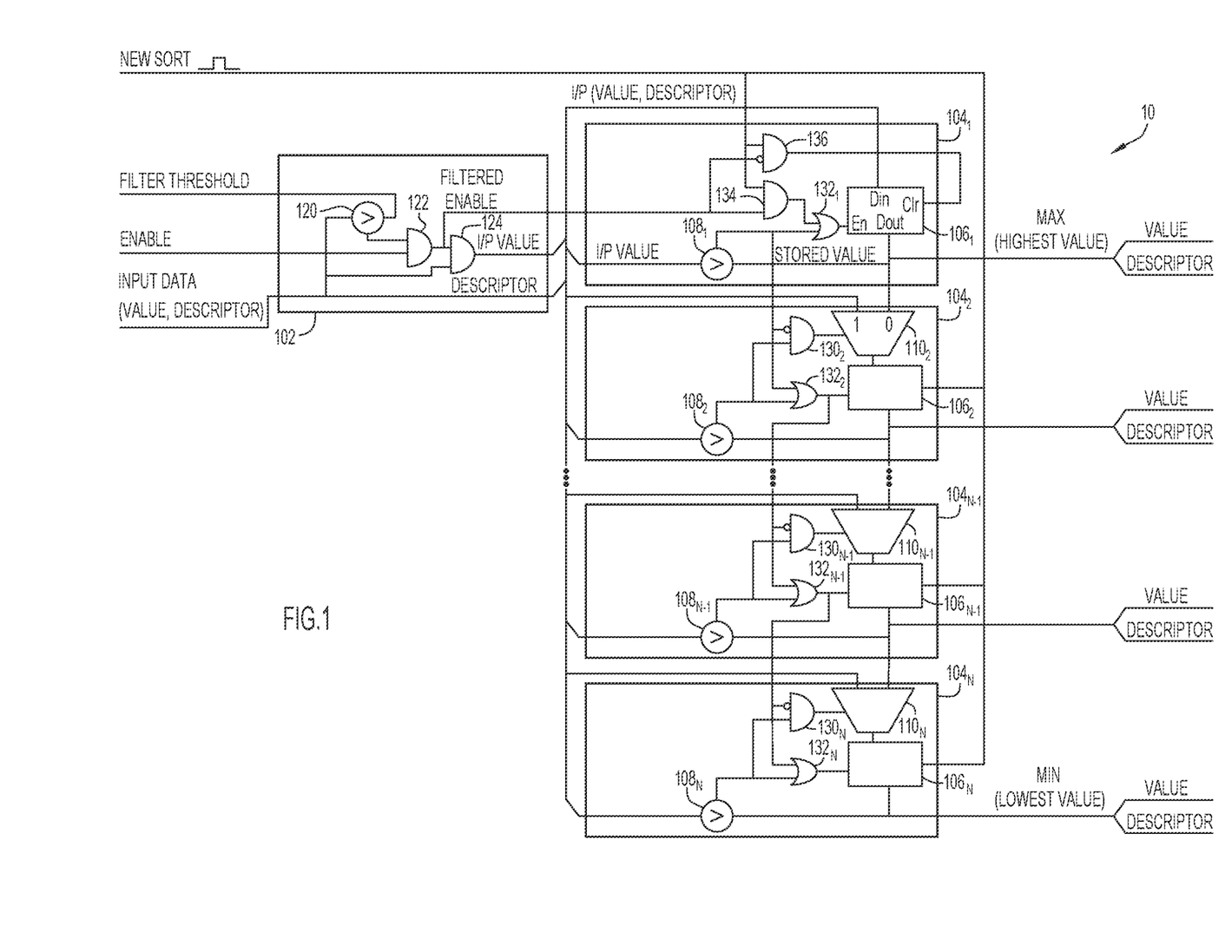
FIG. 1 is a circuit diagram of an example sorting circuit for performing an insertion sorting operation in a single clock cycle.

FIG. 1 is a circuit diagram of an example sorting circuit 10 in which a single-clock insertion sort may be implemented. Sorting circuit 10 includes an input circuit 102 and a set of N stages $104_1$-$104_N$ (collectively referred to as stages 104 and individually referred to generically as stage $104_i$) connected in a linear array or "stack" for sorting and storing data values. Input circuit 102 receives a sequence or stream of input data that includes input data values to be sorted according to their magnitude and serially (i.e., one at a time) supplies the input data to stages 104. The input data may also include a descriptor associated with each data value, which describes some characteristic about the data value, such as contextual information like its source or origin within a set of data. In accordance with a clock signal, input circuit 102 supplies a new input data value to stages 104 in parallel in each clock cycle, and sorting circuit 10 sorts the new input data value relative to data values stored in stages 104 within the clock cycle.

One non-limiting example of an application in which a sequence of input data values requires sorting is the acquisition of signals transmitted from satellites of a Global Navigation Satellite System (GNSS) such as the Global Positioning System (GPS). Acquisition of GNSS spread spectrum signals requires searching in both the time domain and the frequency domain. Synchronizing a receiver with the timing of the received signal involves evaluating the electromagnetic energy arriving at the receiver at multiple different time instances to identify a signal peak indicative of the timing of the spread spectrum signal. Searching in the time domain can be accomplished, for example, with a receiver that performs matched filtering at several different timing offsets or timing "taps."

Owing to position-dependent Doppler effects, the frequency of a received signal is known apriori only to within a range. Use of a discrete Fourier transform in the receiver enables searching in the frequency domain by representing the energy of the received signal in a set of frequency bins that span a frequency range. The frequency bin measuring the greatest signal magnitude holds the best promise as the true frequency of the received signal. Thus, a GNSS receiver may generate received signal values that are associated with specific timing offsets (taps) and frequencies (bins). The signal values having the greatest magnitude are candidates for determining the timing and frequency of the satellite acquisition signal, and the tap/bin identifiers of these high-magnitude signals can be used as feedback in the signal acquisition algorithm to further refine the acquisition search, either by adjusting the timing or frequency, to converge on acquisition of the signal. In this example, an input data value would be the magnitude of the energy of the receiver signal at a particular timing and frequency, and the descriptor would be an indication of the tap/bin of that signal magnitude. To further enhance the capability to sort a high-speed stream of data values in real time, pre-sorting can be performed such that the sequence of data values supplied to input circuit 102 of sorting circuit 10 are culled from a larger set of data values. For example, using the foregoing example, a tournament sort can be perform on the output of a 16-bin discrete Fourier transform, such that only the bin having the highest-magnitude signal value is included in the sequence of data values to be sorted, with the signal values from the other 15 bins being discarded.

While the foregoing example involves an input data stream including both input data values and associated descriptors, in other applications and contexts, data descriptors may not be necessary, and the input data stream could include only input data values to be sorted without associated descriptors. In general, the sequence of input data can include any type of data values having attributes that are sortable according to some standard or known order, including but not limited to magnitude.

Referring again to FIG. 1, input circuit 102 includes a comparator 120 that sequentially compares each input data value to a threshold value to filter out data values that are not within a range of interest. Comparator 120 essentially operates as a threshold filter to prevent data values in the sequence that fail to pass a threshold filter from being supplied to the stages. For example, when performing an insertion sorting operation to find a peak among signals received at a receiver, signals that do not exceed the background noise level are not potential candidates for being a peak signal. In this case, the filter threshold value corresponds to a noise floor, and each input data value is further processed by sorting circuit 10 only if comparator 120 determines that the input data value exceeds the filter threshold value. In other implementations, a comparator may be used to filter out input data signals above a filter threshold, e.g., when searching for data values below a certain level, or outside of two filter thresholds, i.e., passing only input data values that fall within a range of magnitudes bounded by the filter thresholds. In some applications, filtering the sequence of input data values may be unnecessary, in which case use of a filter threshold, comparator 120 and AND gate 122, described below, can be omitted. As used herein, the terms "pass" and "passing" a threshold or threshold value refer generally to a data value being above a minimum threshold, below a maximum threshold, or in a range between two thresholds.

Input circuit 102 also receives an enable signal, which can be a periodic clock signal that enables a sorting operation to be performed on the input data value within a clock period (clock cycle). An AND gate 122 of input circuit 102 receives the enable signal at one input and receives the output of comparator 120 at the other input, such that AND gate 122 passes the enable (clock) signal to stages 104 only if the magnitude of the input data value passes the filter threshold (in this example, exceeds the minimum filter threshold), indicated by a logical "1" output from comparator 120. If the output of comparator 120 is a logical "0" (the input data value failed to pass the filter threshold), then the output of AND gate 122 is a logical "0" and the enable clock signal is disabled, thereby preventing a sorting operation from being performed on the input data value. As such, the output of AND gate 122 is essentially a filtered enable (clock) signal that is disabled for input data values that fail to pass the threshold. A second AND gate 124 of input circuit 102 receives the input data value at one input and the filtered enable signal from the output of AND gate 122 at the other input, such that AND gate 124 supplies the input data value to stages 104 as an output of input circuit 102 in accordance with the filtered enable signal. In the example shown in FIG. 1, input circuit 102 also passes the input data descriptor associated with each input data value to stages 104.

Stages 104 are connected in a linear array forming a bank or "stack" to store data values in order of magnitude from a highest value stored in a highest stage of the stack to a lowest value stored in a lowest stage of the stack. In the example shown in FIG. 1, the stack includes N stages, with stage $104_1$ being the highest stage and stage $104_N$ being the lowest stage. Stages $104_1$-$104_N$ include respective registers $106_1$-$106_N$ (collectively referred to as registers 106 and individually referred to generically as register $106_i$) for storing sorted data values. In this example, registers 106 also store the descriptors associated with the respective stored data values. Since each stage 104; includes a register $106_i$, the registers 106 can also be referred to a stack or bank of registers. Each register $106_i$ includes a data input ($D_{in}$) for receiving data to be stored, a data output ($D_{out}$) that supplies the current contents stored in the register as an output, a clear (Clr) input that receives a signal that clears the contents of the register, and an enable (En) input that enables data received at the data input $D_{in}$ to be stored in the register. For simplicity, the register output and inputs are labeled only on register $106_1$ in FIG. 1. The data supplied at the data output $D_{out}$ of each register $106_i$, which in this example includes both data values and their associated descriptors, can be provided as the output of sorting circuit 10. Specifically, the maximum or highest data value found in the sorting operation and its descriptor are supplied as the output from register $106_1$ of the highest stage $104_1$, the second highest value and its descriptor are supplied as the output from register $106_2$ of the second-highest stage $104_2$, and so on, down to the minimum or lowest data value, and its descriptor, of the set of N largest data values found in the sorting operation, which are supplied as the output from register $106_N$ of the lowest stage $104_N$.

Stages $104_1$-$104_N$ further include respective comparators $108_1$-$108_N$ (collectively referred to as comparators 108 and individually referred to generically as comparator 108i) that compare the input data value received from input circuit 102 with the data value stored in the respective register $106_i$ that is provided at the data output $D_{out}$. Stages $104_2$-$104_N$, but not stage $104_1$, further include respective 2-to-1 multiplexers $110_2$-$110_N$ (collectively referred to as multiplexers 110 and individually referred to generically as multiplexer 110i) that receive the input data value and its associated descriptor at one input and the data value currently stored in register $106_{i-1}$ of the next-highest stage $104_{i-1}$ in the stack at the other input, together with its associated descriptor. The output of each multiplexer $110_i$ is supplied to the data input $D_{in}$ of register $106_i$. Multiplexer $110_i$ is controlled by a multiplexer control input received from the output of a multiplexer-control AND gate $130_i$ to supply to the data input $D_{in}$ of register $106_i$ either the input data value and its descriptor or the next-highest data value currently stored in register $106_{i-1}$ of the next-highest stage $104_{i-1}$ and its descriptor.

When receiving a logical "1" input, the enable input En of each register $106_i$ enables the register $106_i$ to store the data supplied at the data input $D_{in}$ of register $106_i$. In the case of stages $104_2$-$104_N$ (i.e., all but the highest stage $104_1$), the data input $D_{in}$ of each register $106_1$ receives the output of multiplexer $110_i$. In the case of the highest stage $104_1$, the data input $D_{in}$ of register $106_1$ receives the input data value and its descriptor. When the enable input En of register $106_i$ receives a logical "0" input, reading of data at the data input $D_{in}$ is disabled and the contents of the register $106_i$ do not change in the clock cycle. An enable-control OR gate $132_i$ supplies the control signal to the enable input En of register $106_i$. In the case of stages $104_3$-$104_N$ (i.e., all but the highest two stages $104_1$ and $104_2$), enable-control OR gate $132_i$ receives the output of comparator $108_i$ of its own stage $104_i$ at one input and the output of the enable-control OR gate $132_{i-1}$ of the next-highest stage $104_{i-1}$ in the stack at the other input. In the case of stage $104_2$ (the second-highest stage), enable-control OR gate $132_2$ receives the output of comparator $108_2$ at one input and the output of the comparator $108_1$ of the highest stage $104_1$ in the stack at the other input. In the case of stage $104_1$ (the highest stage in the stack), enable-control OR gate $132_1$ receives the output of comparator $108_1$ at one input. At the other input, enable-control OR gate $132_1$ receives the output of a new sort enable AND gate 134 of stage $104_1$. New sort enable AND gate 134 receives the filtered enable signal from input circuit 102 at one input. At the other input, new sort enable AND gate 134 receives a "new sort" signal that signifies the beginning of a sorting time period or interval. New sort enable AND gate 134 ensures that enable-control OR gate $132_1$ enables register $106_1$ to store a data value received simultaneously with a new sort pulse. Highest stage $104_i$ also includes a reset control AND gate 136 that receives the filtered enable signal at one, inverted input and receives the new sort signal at the other input. The output of reset control AND gate 136 is supplied to the clear input Clr of register $106_1$ to clear the contents of register $106_1$ at the beginning of a new sort if a new input data value is not being received simultaneously with the new sort pulse. The new sort signal is also supplied to the clear input Cr of each register $106_2$-$106_N$ to clear the contents of these registers at the beginning of a new sorting time interval.

Each multiplexer-control AND gate $130_3$-$130_N$ (i.e., all multiplexer-control AND gates in the stack except for multiplexer-control AND gate $130_2$ in stage $104_2$) receives the output of comparator $108_i$ of its stage $104_i$ at one input and the output of the enable-control OR gate $132_{i-1}$ of the next-highest stage $104_{i-1}$ in the stack at the other input, which is an inverted input. In the case of stage $104_2$ (the second-highest stage), multiplexer-control AND gate $130_2$ receives the output of comparator $108_2$ at one input and the output of the comparator $108_1$ of the highest stage $104_1$ in the stack at the other input, which is an inverted input.

Sorting circuit 10 implements an insertion sorting scheme as follows. Input circuit 102 receives a sequence of input data values and supplies one input data value at a time to each of the stages 104 of the stack in parallel, optionally using comparator 120 to filter out input data values that fall outside a magnitude range of interest. Comparators $108_1$-$108_N$ of stages $104_1$-$104_N$ receive the input data value in parallel and substantially simultaneously compare the input data value to the data value that is currently stored in the respective register $106_1$-$106_N$ to determine whether or not the input data value is greater than the stored data value in each register $106_i$. As used herein, the term "substantially simultaneously" means with a timing offset that is less than single gate delay or zero.

Stages in the stack whose registers are currently storing data values that are greater than or equal to the input data value are not impacted by the input data value, since the input data value will be inserted, if at all, lower in the stack than these higher-magnitude data values. If the input data value is not greater than any of the data values currently stored in the registers of the stages in the stack, then no changes occur in the set of stored data values, because the input data value is not among the N highest data values received so far in the sorting time interval. If the input data value is greater than at least one data value currently stored in the stack, the input data value is stored in the register of the highest stage in the stack currently storing a data value that is less than the input data value. This stage/register can be called the "insertion stage" and its register can be called the "insertion register," because the input data value is inserted into the stack of data values at that register/stage. Registers of every stage lower in the stack than the insertion stage receive and store the data value currently stored in the register of the next-highest stage in the stack. That is, the data value currently being stored in the insertion register into which the input data value is to be stored and all data values stored in stages lower in the stack are shifted down one stage upon insertion of the input data value, with the lowest data value previously stored in the register of the lowest ($N^{th}$) stage being dropped, because that data value is no longer among the highest N data values that have been received and sorted in the sorting time interval. This sorting scheme captures and orders the highest magnitude N data values (i.e., "peak" values) in a sequence of M data values, where M≥N, received within the sorting time interval.

For the highest (first) stage $104_1$ in the stack, which stores the highest value received so far in the sorting time interval, only two outcomes are possible from sorting each input data value. If the input data value is not greater than the data value stored in register $106_1$ of the highest stage $104_1$, then the data value previously stored in the register $106_1$ remains stored in register $106_1$, because this stored data value is still the highest value received and sorted so far in the sorting time interval. If the input data value is greater than the value stored in the register $106_1$ of the highest stage $104_1$, the input data value replaces the data value stored in the register $106_1$ of the highest stage $104_1$, because the input data value had been determined to be the new highest data value received so far in the sorting time interval.

For the second through $N^{th}$ stages $104_2$-$104_N$, three outcomes are possible from sorting each input data value. If the input data value is not greater than the data value stored in register $106_i$ of stage $104_i$, then the data value previously stored in the register $106_i$ remains stored in register $106_i$, and the new input data value will be inserted into a lower stage of the stack, if at all. If the input data value is greater than the value stored in the register $106_i$ of stage $104_i$, the data value currently stored in register $106_i$ will be replaced by either the input data value or the data value currently stored in the register $106_{i-1}$ of the next-highest stage $104_{i-1}$ in the stack. The input data value will replace the currently stored data value of register $106_i$ of stage $104_i$ (i.e., register $106_i$ will be the insertion register and stage $104_i$ will be the insertion stage) if stage $104_i$ is the highest stage in the stack whose currently stored data value is less than the input data value. Otherwise, the data value currently stored in the next-highest stage $104_{i-1}$ will replace the currently stored data value of register $106_i$ of stage $104_i$.

Figure 2:
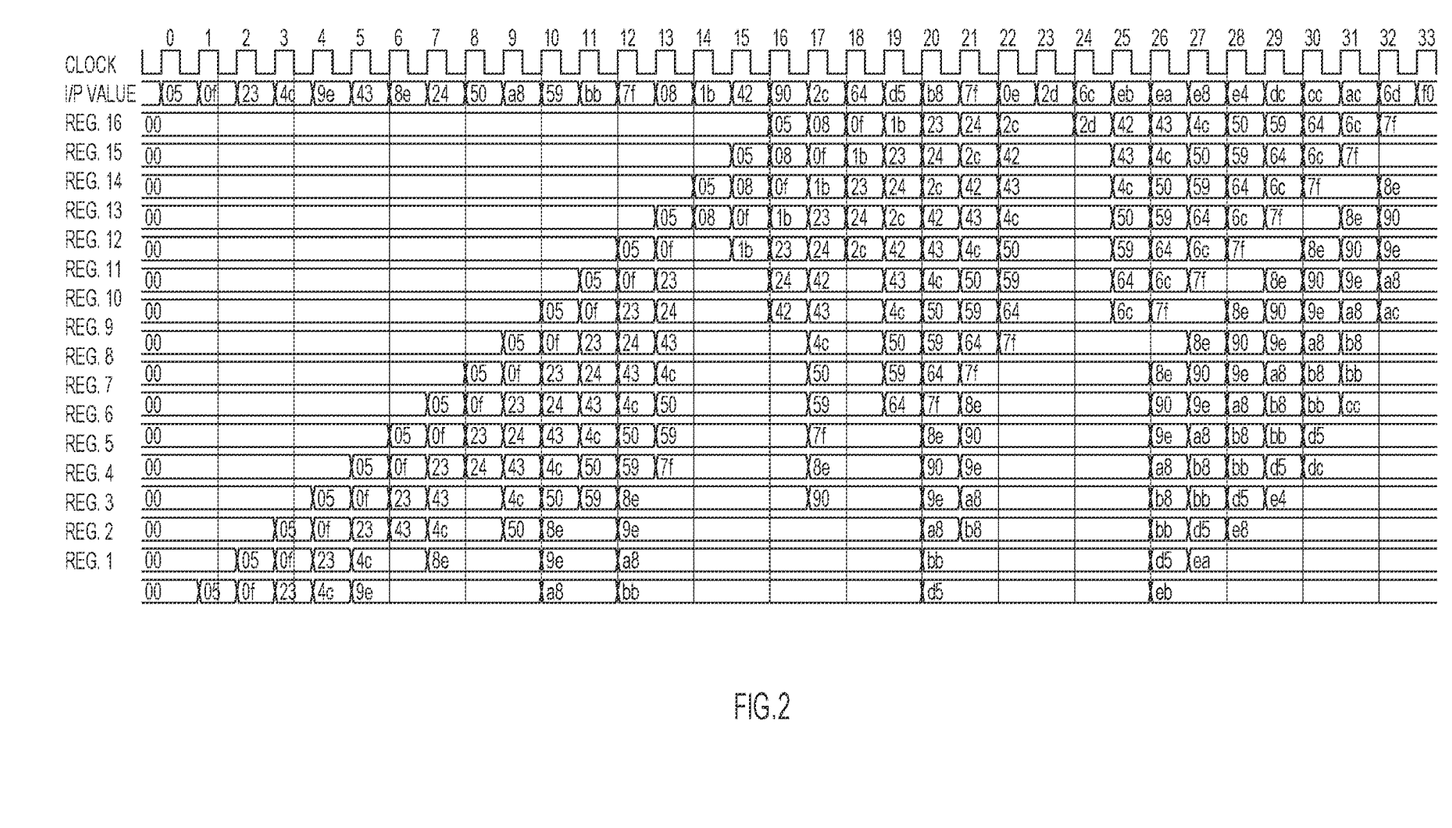
FIG. 2 is a timing diagram demonstrating how an example stream of input data values are sorted according to their magnitude into registers of a stack.

FIG. 2 is a timing diagram demonstrating how an example of input data values supplied in a stream or sequence are serially sorted one-by-one according to their magnitude into registers/stages of a stack. In this example, the data values are represented as two-digit hexadecimal values, which is equivalent to an 8-bit binary value, since each digit of a hexadecimal value corresponds to a 4-bit binary value. As used herein, the term "binary" encompasses representations in any base whose radix is a power of two, including octal and hexadecimal. More generally, the data values sorted by the described sorting circuit can be represented in any numbering system, including decimal. In the example shown in the timing diagram of FIG. 2, data values are sorted by magnitude into 16 registers (N=16), with register $106_1$ being the highest register storing the highest (greatest magnitude) data value and register $106_{16}$ being the lowest register storing the lowest (smallest magnitude) of the 16 highest (greatest magnitude) data values identified during the sorting time interval.

Each cycle of a clock signal, shown at the top of FIG. 2, supplies a new, two-digit hexadecimal input data value to sorting circuit 10. For simplicity, this example ignores the optional input data filtering that can be performed by input circuit 102. FIGS. 3A-3D illustrate the position of sorted data values in the two-highest and two-lowest registers of sorting circuit 10 of FIG. 1 at selected clock cycles of the timing diagram of FIG. 2. At the beginning of a sorting time interval, the contents of all 16 registers have been cleared and so the hexadecimal value "00" is stored in all registers. In a first clock cycle, the input data value "05" is supplied in parallel to the 16 registers of the stack. Since the input data value "05" is greater than the data value "00" stored in all the registers, the input data value "05" is inserted into the highest register $106_1$, and the stored data values "00" are shifted downward in the stack, such that registers $106_2$-$106_{16}$ continue to store data values "00." In FIG. 2, this state can be seen in the column under Clock "1" where register $106_1$, shown at the bottom of the diagram, contains the data value "05" and the rest of the registers continue to contain the data values "00." FIG. 3A also shows the contents of selected registers 106 of sorting circuit 10 at "clock 1," with register $106_1$ containing the data value "05."

Figure 3A:
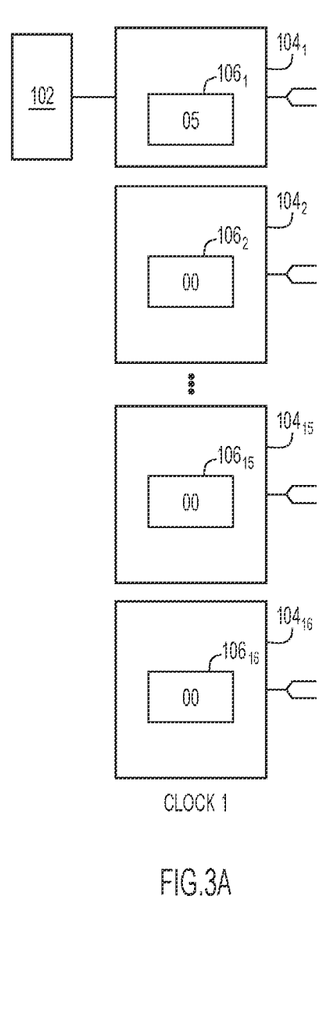
FIGS. 3A-3D illustrate the position of certain input values in registers of the sorting circuit of FIG. 1 at selected clock cycles of the timing diagram of FIG. 2.
Figure 3B:
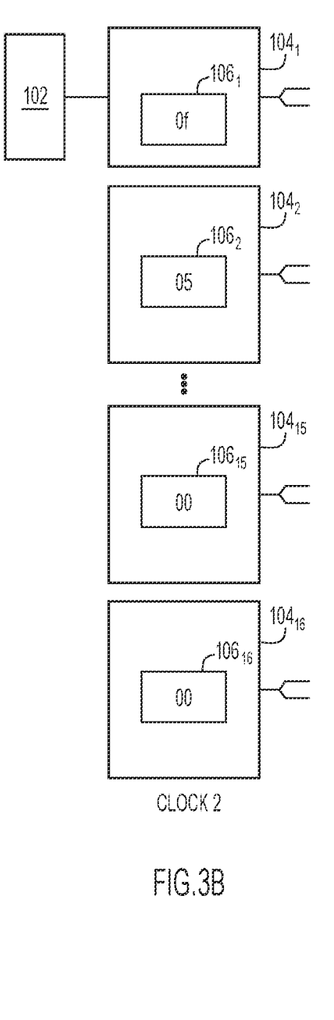

In the second clock cycle ("clock 2"), the input data value "0f" is supplied in parallel to the 16 registers of the stack. Since the input data value "0f" is greater than the data value "05" stored in the highest register $106_1$, the input data value "0f" is inserted into the highest register $106_1$, and the data value "05" previously stored in the highest register is shifted down and stored in the next-lowest (second) register $106_2$. The data values "00" previously stored in registers $106_2$-$106_{16}$ are shifted downward one register in the stack, such that registers $106_3$-$106_{16}$ continue to store data values "00." This state of selected registers 106 of sorting circuit 10 is shown in FIG. 3B and can also be seen in the column below clock "2" in FIG. 2. As further shown in FIG. 2, over the first 16 clock cycles, the first 16 input data values within the sorting time interval fill up the 16 registers 106 of sorting circuit 10, arranged according to their magnitude from highest (in register $106_1$) to lowest (in register $106_{16}$).

Figure 3C:
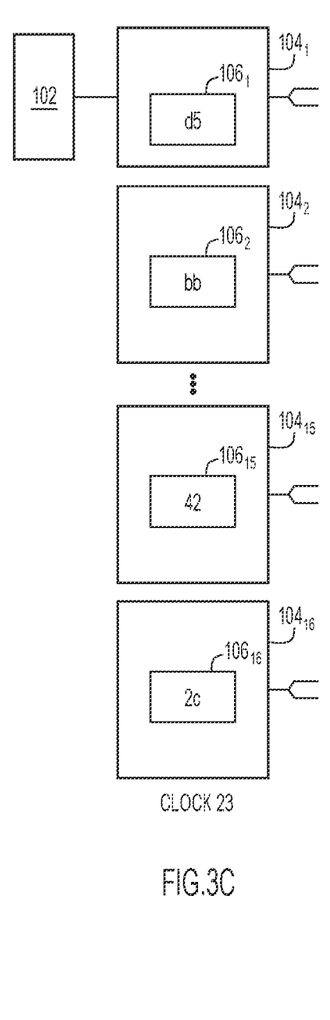
Figure 3D:
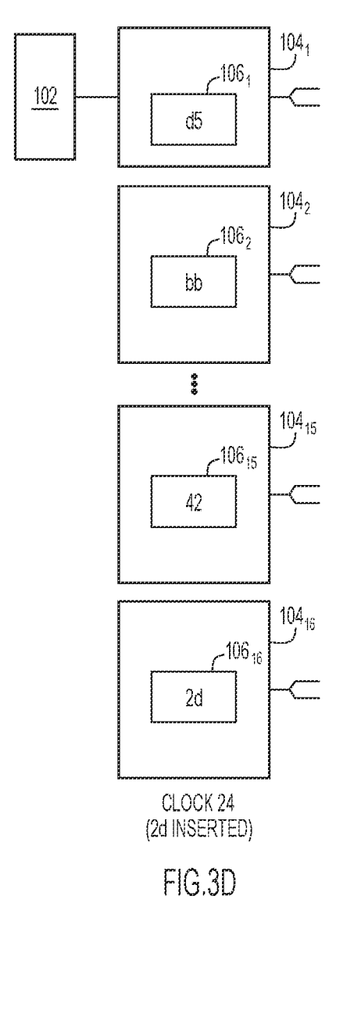

Once all 16 registers contain non-zero values, subsequent input data values are inserted into the stack only if their magnitude is greater than at least one value currently stored in the registers. For example, as shown in FIG. 2, at "clock 23," the contents of registers 106 are "d5," "bb," "b8," "a8," "9e," "90," "8e," "7f," "f," "64," "59," "50," "4c," "43," "42," and "2c." The contents of the two-highest registers $106_1$ ("d5") and $106_2$ ("bb") and the two-lowest registers $106_{15}$ ("42") and $106_{16}$ ("2c") at clock cycle 23 are shown in FIG. 3C. At clock cycle 24, the input data value "2d" is supplied in parallel to the 16 registers of the stack. Since the input data value "2d" is not greater than the data values stored in registers $106_1$-$106_{15}$, the contents of these registers are not replaced and remain unchanged. However, since the input data value "2d" is greater than the data value "2c" stored in the lowest register $106_{16}$, the input data value "2d" is inserted into the lowest register $106_1$, and replaces the data value "2c" previously stored in the lowest register, which is dropped from the stack of stored data values. This state of selected registers 106 of sorting circuit 10 is shown in FIG. 3D and can also be seen in the column below clock "24" in FIG. 2.

Referring again to FIG. 1, in operation, comparators 108 of stages 104 receive an input data value in parallel and substantially simultaneously determines whether the input data value is greater than the data value stored in the respective registers 106 and supplied at the data output $D_{out}$. Registers 106 storing data values greater than or equal to the input data value are not enabled and their contents do not change in the clock cycle for the input data value. Registers 106 storing data values less than the input data value are enabled to store a replacement data value received at the data input $D_{in}$, which is the input data value in the case of the insertion register (the highest register in the stack whose stored data value is less than the input data value) and is the stored data value received from the output $D_{out}$ of the next-highest register in the stack for registers lower in the stack than the insertion register. More specifically, for stages $104_3$-$104_N$ enable-control OR gate $132_i$ receives the output of comparator $108_i$ of its own stage $104_i$ at one input and the output of the enable-control OR gate $132_{i-1}$ of the next-highest stage $104_{i-1}$ in the stack at the other input. Consequently, for these stages, enable-control OR gate $132_i$ enables register $106_i$ to receive the replacement data value for storage if comparator $108_i$ determines that the input data value is greater that the data value currently stored in register $106_i$ of that stage $104_i$ or if enable-control OR gate $132_{i-1}$ of the next-highest stage $104_{i-1}$ has enabled the register $106_{i-1}$ of the next-highest stage $104_{i-1}$. In the case of the second-highest stage $104_2$, enable-control OR gate $132_2$ receives the output of comparator $108_2$ at one input and the output of the comparator $108_1$ of the highest stage $104_1$ at the other input. Consequently, enable-control OR gate $132_2$ enables register $104_2$ to receive a replacement data value for storage if comparator $108_2$ determines that the input data value is greater than the data value currently stored in register $106_2$ of stage $104_2$ or if comparator $108_1$ determines that the input data value is greater than the data value currently stored in register $106_1$ of stage $104_1$. In the case of the highest stage $104_1$, enable-control OR gate $132_1$ receives the output of comparator $108_1$ at one input. Consequently, enable-control OR gate $132_1$ enables register $104_1$ to receive the input data value for storage if comparator $108_1$ determines that the input data value is greater than the data value currently stored in register $106_1$ of stage $104_1$.

While the replacement data value supplied to the data input $D_{in}$ of register $106_1$ of the highest stage $104_1$ is the input data value (because there is no higher stage from which a stored data value can be shifted down the stack), for stages $104_2$-$104_N$, the replacement data value can be either the input data value or the data value currently stored in and received from the register $106_{i-1}$ of the next-highest stage in the stack $104_{i-1}$, depending on the selections made by the respective multiplexers $110_2$-$110_N$ under the control of respective multiplexer-control AND gates $130_2$-$130_N$. For an enabled register $106_i$, when the output of multiplexer-control AND gate $130_i$ is a logical "1," the multiplexer $110_i$ selects the input data value as the replacement data value to be supplied at the data input $D_{in}$ of register $106_i$, i.e., register $106_i$ is the insertion register and stage $104_i$ is the insertion stage. For stages $104_3$-$104_N$, with an enabled register $106_i$, this condition occurs when both the output of comparator $108_i$ is a logical "1" (one input of multiplexer-control AND gate $130_i$), indicating that input data value is greater than the data value currently stored in register $106_i$, and the output of the enable-control OR gate $132_{i-1}$ of the next-highest stage is a logical "0" (the other, inverted input of multiplexer-control AND gate $130_i$), indicating that register $106_{i-1}$ of the next-highest stage $104_{i-1}$ is not enabled (because the data value stored in register $106_{i-1}$ is greater than or equal to the input data value and will not be replaced in this clock cycle). For stage $104_2$, this condition occurs when both the output of comparator $108_2$ is a logical "1," indicating that input data value is greater than the data value currently stored in register $106_2$, and the output of comparator $108_1$ is a logical "0," indicating that register $106_1$ of the highest stage $104_1$ is not enabled (because the data value stored in register $106_1$ is greater than or equal to the input data value and will not be replaced in this clock cycle).

When the output of multiplexer-control AND gate $130$; is a logical "0," the multiplexer $110_i$ selects the data value currently stored in and received from the data output $D_{out}$ of register $106_{i-1}$ of the next-highest stage in the stack $104_{i-1}$ as the replacement data value to be supplied at the data input $D_{in}$ of register $106_i$. In other words, for an enabled register $106_i$, the data value that had been stored in the register of the next-highest stage in the stack is shifted down and stored therein. For stages $104_3$-$104_N$, with an enabled register $106_i$, this condition occurs when the output of the enable-control OR gate $132_{i-1}$ of the next-highest stage is a logical "1," indicating that register $106_{i-1}$ of the next-highest stage $104_{i-1}$ is enabled (because the input data value is greater than the data value stored in register $106_{i-1}$). For stage $104_2$, this condition occurs when the output of comparator $108_1$ is a logical "1," indicating that register $106_1$ of the highest stage $104_1$ is enabled (because the input data value is greater than the data value stored in register $106_1$, which is the insertion register in this clock cycle).

Since each stage of the stack supplies control signals to the next stage in the stack to effect insertion and shifting of data values, each stage of the stack introduces a propagation delay. As the number of stages in the stack increases, the overall propagation delay from the highest stage to the lowest stage increases because the propagation delays cascade from one stage to the next down the stack. To perform a sorting operation within a single clock cycle, the overall propagation delay from the highest stage to the lowest stage must be less than the duration of a clock cycle, thereby placing an upper limit on the clock period and clock frequency. In other words, the propagation delays associated with determining replacement data values throughout the stack must be sufficiently short to enable the input data value to be sorted into the stack of stored data values in a single clock cycle of the sorting circuit. A one gate delay from stage to stage is the absolute minimum that can be achieved when shifting a stack of data values.

The architecture of sorting circuit $10$ shown in FIG. 1 enables an insertion sorting algorithm to be performed in a single clock cycle with minimal hardware (e.g., a low gate count and minimal combinatorial delays) to enable a high clock rate and low power requirements, resulting in greater speed and simplicity compared to prior sorting schemes. Each stage $104$; in sorting circuit $10$ introduces a propagation delay of only a single gate delay, specifically that of the enable-control OR gate $132_i$, whose output is supplied as an input to the multiplexer-control AND gate $130_{i+1}$ for controlling multiplexer $110_{i+1}$ that shifts the data value to the next-lowest stage $104_{i+1}$ in the stack. A 16-stage stack results in an overall propagation delay having a duration of only 15 gate delays for the control signal to propagate from the highest stage to the lowest stage. More generally, the total end-to-end propagation delay of an N-stage stack with this architecture has a duration of no more than N−1 gate delays. With each added stage, only one additional gate delay is added to the overall propagation delay through the stack. The duration of a gate delay varies from circuit technology to circuit technology, thereby impacting maximum clock rate feasible for a given number of stages in the sorting stack.

According to one example, in a present-day Application Specific Integrated Circuit (ASIC), a typical gate delay might be on the order of 0.1 ns. In this case, a 16-stage stack would introduce a total propagation delay of 15 gate delays, or 1.5 ns. Thus, the maximum feasible clock period would be just greater than that duration, e.g., 1.6 ns or a 625 MHz clock rate. For a sorting time interval on the order of 1 s, the N highest-magnitude data values out of hundreds of input data values can be sorted and identified, and within a 1 ms sorting time interval, the N highest-magnitude data values out of hundreds of thousands of input data values can be sorted and identified. These sorting speeds enable sorting in real time of a continuous stream of real-time data. In navigation and communications applications, the advantage of a simplified, accelerated sorting mechanism is faster acquisition of the desired signal, less ASIC implementation area and associated lower power consumption. In signal acquisition applications, for example, the faster sorting can be performed to identify peak magnitude signals, the faster feedback can be provided to the acquisition searching algorithm, enabling a more rapid convergence on the signal timing and frequency and signal acquisition. The described sorting circuit can be implemented in any type of hardware, including but not limited to ASICs, field programmable gate arrays (FPGAs), and circuits fabricated with discrete hardware components.

Figure 4:
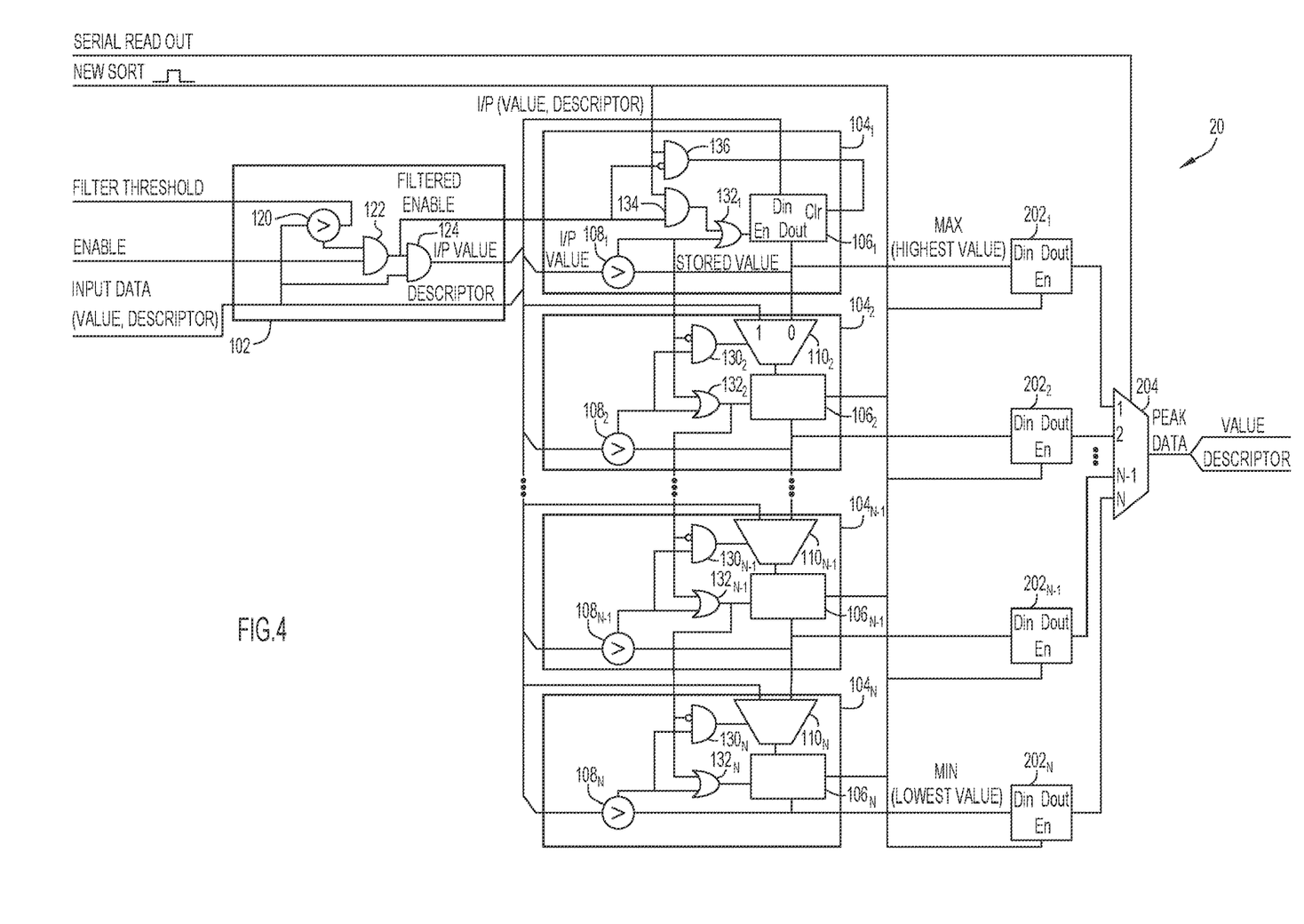
FIG. 4 is a circuit diagram of the sorting circuit of FIG. 1 with the addition of holding registers downstream of the sorting circuitry.

FIG. 4 is a circuit diagram of a sorting circuit $20$, which is similar to sorting circuit $10$ of FIG. 1 with the addition of holding registers downstream of the sorting circuitry. Specifically the data output $D_{out}$ of each register $106_1$-$106_N$ is supplied to the data input $D_{in}$ of a respective holding register $202_1$-$202_N$ (collectively referred to as holding registers $202$ and individually referred to generically as holding register $202_i$) for storing the peak data values sorted within a sorting time interval at the conclusion of the sorting time interval. In this example, holding registers $202$ also store the descriptors associated with the respective stored peak data values. Each holding register $202_i$ further includes a data output $D_{out}$ that supplies the current contents stored in the holding register $202_i$ as an output, and an enable (En) input that enables data received at the data input $D_{in}$ to be stored in the holding register $202_i$. For simplicity, the register output and inputs are labeled only on holding register $202_1$ in FIG. 4. The data supplied at the data output $D_{out}$ wr of each holding register $202_i$, which in this example includes both data values and their associated descriptors, can be provided to an N×1 output multiplexer 204. The enable inputs En of holding registers 202 simultaneously receive the "new sort" signal, which enables the contents of registers 106, which are supplied at the data outputs $D_{out}$ of registers 106 and received at the respective data inputs $D_{in}$ of holding registers 202, to be read into holding registers 202 at the beginning of each sorting time interval, such that the results of the previous sorting time interval are stored in holding registers 202 as the next sorting time interval begins.

Thus, the "new sort" signal both clears registers 106 and moves the sorted peak data values and associated descriptors stored in registers 106 into respective holding registers 202, signifying the beginning of a new sorting time interval. If a new sorting time interval is initiated every 1 ms, then holding registers 202 can maintain the sorted peak data values from the previous sorting time interval for that period of time. As there is no post collection sorting delay, sorted data values can be transferred to holding registers 202 while sorting circuit 20 continues to sort new incoming data values in the next sorting time interval. This arrangement negates the need for an entire duplication of the hardware to read results without dropping data. If, in some applications, it is acceptable to read sorting results while still updating the sorted stack based on incoming data values (i.e., within a sorting time interval), or to pause collection when reading or resetting results, resources may be saved by omitting holding registers 202. Output multiplexer 204 respectively receives in parallel at its N inputs the N peak data values and their descriptors stored in the N storage registers 202 and performs a parallel-to-serial operation in accordance with a "serial read out" signal to supply as a output a serial stream of the N peak data values and their descriptors.

Figure 5:
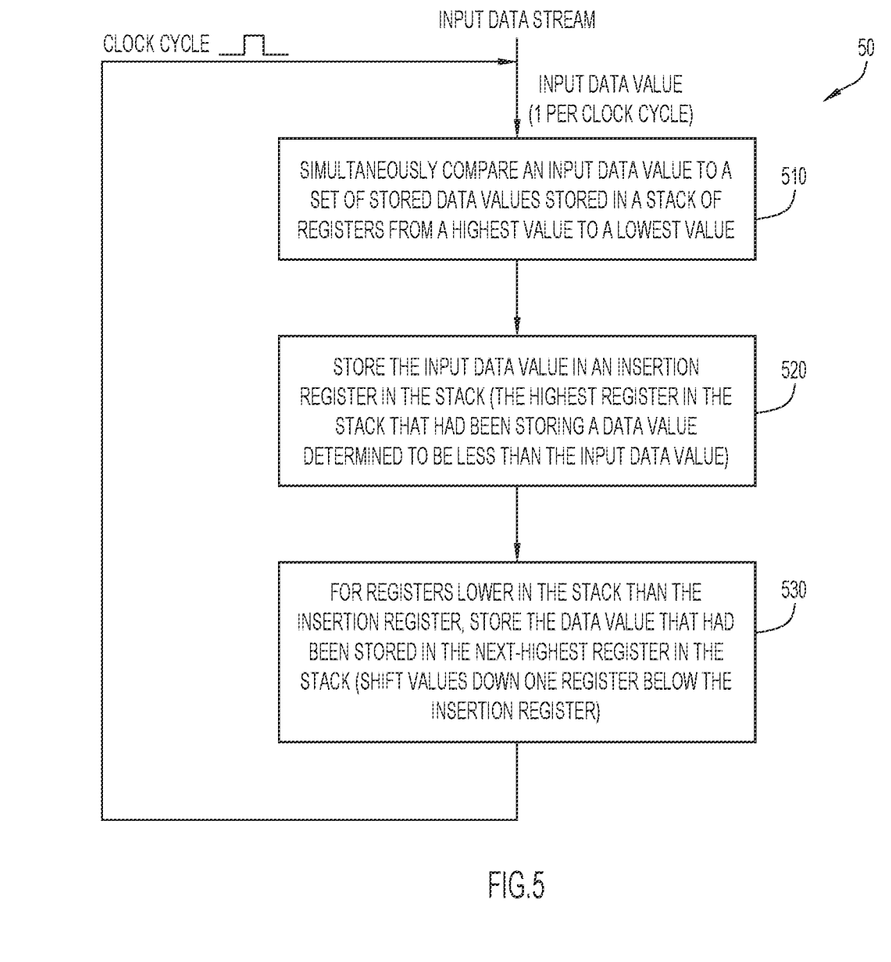
FIG. 5 is a flowchart of an example method of sorting an input data value into a set of stored data values in a single clock cycle of a sorting circuit.

FIG. 5 is a flowchart of an example method of sorting an input data value into a set of stored data values in a single clock cycle of a sorting circuit. In each clock cycle, an input data value from an input data stream or sequence is supplied to the sorting circuit. In a first operation 510, the sorting circuit simultaneously compares the input data value to a set of stored data values respectively stored in a stack of registers from the highest value stored in a highest register to the lowest value stored in a lowest register. In operation 520, the sorting circuit stores the input data value in an insertion register in the stack. The insertion register is the highest register in the stack that had been storing a stored data value determined to be less than the input data value. In operation 530, for registers lower in the stack than the insertion register, the sorting circuit stores a data value that had been stored in a next-highest register in the stack, such that stored data values less than the input data value are shifted down one register in the stack.

In summary, in some aspects, the techniques described herein relate to a sorting circuit comprising: an input circuit to receive a sequence of data values; and stages in a stack to store data values in order of magnitude from a highest value stored in a highest stage of the stack to a lowest value stored in a lowest stage of the stack. Individual ones of the stages comprise: a register to store a stored data value; a comparator to determine whether an input data value received from the input circuit is greater than the stored data value currently stored in the register, an output of the comparator enabling the register to store a replacement data value in response to the input data value being greater than the stored data value; and a multiplexer to select the replacement data value to be supplied to the register in response to the register being enabled by the comparator. The replacement data value is selected, based on an output of a comparator of a next-highest stage in the stack, as either the input data value or a next-highest stored data value currently stored in a register of the next-highest stage in the stack.

In some aspects, the techniques described herein relate to a sorting circuit, wherein the multiplexer selects the replacement data value as the next-highest stored data value in response to the comparator of the next-highest stage determining that the input data value is greater than the next-highest stored data value, and wherein the multiplexer selects the replacement data value as the input data value in response to the comparator of the next-highest stage determining that the input data value is not greater than the next-highest stored data value.

In some aspects, the techniques described herein relate to a sorting circuit wherein the comparator does not enable the register to store the replacement data value in response to the input data value not being greater than the stored data value.

In some aspects, the techniques described herein relate to a sorting circuit wherein the input data value is stored in an insertion stage, which is a highest stage in the stack currently storing a stored data value that is less than the input data value, and stages lower in the stack than the insertion stage store the stored data value received from the next-highest stage in the stack, such that stored data values less than the input data value are shifted down one stage in the stack.

In some aspects, the techniques described herein relate to a sorting circuit wherein the input circuit receives a clock signal and supplies a new input data value to the stages in parallel in each clock cycle, and wherein the sorting circuit sorts the new input data value relative to stored data values stored in the stages of the stack within a single clock cycle.

In some aspects, the techniques described herein relate to a sorting circuit wherein no more than a single gate delay results from supplying the output of the comparator of one of the stages to a next of the stages such that a propagation delay to perform a sort operation in a stack of N stages is no more than a duration of N−1 gate delays.

In some aspects, the techniques described herein relate to a sorting circuit wherein the propagation delay to perform a sorting operation is less than a clock period used by the input circuit to supply each input data value of the sequence of data values to the stages.

In some aspects, the techniques described herein relate to a sorting circuit wherein the input circuit supplies the input data value to comparators of the stages in parallel, and the comparators substantially simultaneously determine whether the input data value is greater than stored data values stored in respective registers of the stages.

In some aspects, the techniques described herein relate to a sorting circuit wherein the input circuit includes a threshold filter to prevent data values in the sequence of data values that fail to pass the threshold filter from being supplied to the stages.

In some aspects, the techniques described herein relate to a sorting circuit wherein the individual ones of the stages further include an AND gate to control the multiplexer to: select the replacement data value as the next-highest stored data value when the comparator determines that the input data value is greater than the stored data value and the comparator of the next-highest stage determines that the input data value is greater than the next-highest stored data value; or select the replacement data value as the input data value when the comparator determines that the input data value is greater than the stored data value and the comparator of the next-highest stage determines that the input data value is not greater than the next-highest stored data value.

In some aspects, the techniques described herein relate to a sorting circuit wherein the individual ones of the stages further include an OR gate to control enabling of the register to store the replacement data value when either the comparator determines that the input data value is greater than the stored data value or the comparator of the next-highest stage determines that the input data value is greater than the next-highest stored data value.

In some aspects, the techniques described herein relate to a sorting circuit wherein the sequence of data values is received by the input circuit in real time, and the sorting circuit performs a sort operation on data values in the sequence in real time.

In some aspects, the techniques described herein relate to a sorting circuit wherein the input and stored data values are represented as binary digits or decimal digits.

In some aspects, the techniques described herein relate to a sorting circuit wherein the register further stores a descriptor of the stored data value, the descriptor indicating a characteristic of the stored data value.

In some aspects, the techniques described herein relate to a sorting circuit further comprising holding registers respectively corresponding to the stages, wherein stored data values in the registers of the stages are stored in the holding registers in response to a new sort signal that indicates a beginning of a new sorting time interval.

In some aspects, the techniques described herein relate to a sorting circuit comprising: a stack of registers to store a set of stored data values from a highest value to a lowest value; comparators to substantially simultaneously compare an input data value to the set of stored data values stored in respective ones of the registers, the comparators enabling registers whose stored data values are less than the input data value to receive a replacement data value; and multiplexers, each multiplexer being associated with a register in the stack to select the replacement data value for the register when the register is enabled, the multiplexer selecting the input data value as the replacement data value if the register is a highest register in the stack currently storing a stored data value that is less than the input data value, the multiplexer otherwise selecting as the replacement data value a data value stored in a next-highest register in the stack, wherein propagation delays associated with determining replacement data values throughout the stack are sufficiently short to enable the input data value to be sorted into the set of stored data values in a single clock cycle of the sorting circuit.

In some aspects, the techniques described herein relate to a sorting circuit further comprising an input circuit to receive a clock signal and a sequence of input data values, the input circuit supplying one of the input data values to the comparators and the multiplexers in each cycle of the clock signal.

In some aspects, the techniques described herein relate to a sorting circuit wherein the sequence of input data values is received by the input circuit in real time, and the sorting circuit performs a sort operation on the input data values in the sequence in real time.

In some aspects, the techniques described herein relate to a sorting circuit wherein no more than a single gate delay results from propagating selection of the replacement data value from one register to a next-lowest register in the stack.

In some aspects, the techniques described herein relate to a method of sorting an input data value into a set of stored data values in a single clock cycle of a sorting circuit, the method comprising, within the single clock cycle: substantially simultaneously comparing the input data value to a set of stored data values respectively stored in a stack of registers from a highest value stored in a highest register to a lowest value stored in a lowest register; storing the input data value in an insertion register in the stack, the insertion register being a highest register in the stack that had been storing a stored data value determined to be less than the input data value; and for registers lower in the stack than the insertion register, storing a data value that had been stored in a next-highest register in the stack, such that stored data values less than the input data value are shifted down one register in the stack.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A sorting circuit, comprising:
   an input circuit to receive a sequence of data values; and
   stages in a stack to store data values in order of magnitude from a highest value stored in a highest stage of the stack to a lowest value stored in a lowest stage of the stack, wherein individual ones of the stages comprise:
   a register to store a stored data value and a descriptor indicating a characteristic of the stored data value;
   a comparator to determine whether an input data value received from the input circuit is greater than the stored data value currently stored in the register, an output of the comparator enabling the register to store a replacement data value in response to the input data value being greater than the stored data value; and
   a multiplexer to select the replacement data value to be supplied to the register in response to the register being enabled by the comparator, the replacement data value being selected, based on an output of a comparator of a next-highest stage in the stack, as either the input data value or a next-highest stored data value currently stored in a register of the next-highest stage in the stack.

2. The sorting circuit of claim 1, wherein:
   the multiplexer selects the replacement data value as the next-highest stored data value in response to the comparator of the next-highest stage determining that the input data value is greater than the next-highest stored data value; and
   the multiplexer selects the replacement data value as the input data value in response to the comparator of the next-highest stage determining that the input data value is not greater than the next-highest stored data value.

3. The sorting circuit of claim 1, wherein the comparator does not enable the register to store the replacement data value in response to the input data value not being greater than the stored data value.

4. The sorting circuit of claim 1, wherein the input data value is stored in an insertion stage, which is a highest stage in the stack currently storing a stored data value that is less than the input data value, and stages lower in the stack than the insertion stage store the stored data value received from the next-highest stage in the stack, such that stored data values less than the input data value are shifted down one stage in the stack.

5. The sorting circuit of claim 1, wherein:
the input circuit receives a clock signal and supplies a new input data value to the stages in parallel in each clock cycle; and
the sorting circuit sorts the new input data value relative to stored data values stored in the stages of the stack within a single clock cycle.

6. The sorting circuit of claim 1, wherein no more than a single gate delay results from supplying the output of the comparator of one of the stages to a next of the stages such that a propagation delay to perform a sort operation in a stack of N stages is no more than a duration of N−1 gate delays.

7. The sorting circuit of claim 6, wherein the propagation delay to perform a sort operation is less than a clock period used by the input circuit to supply each input data value of the sequence of data values to the stages.

8. The sorting circuit of claim 1, wherein the input circuit supplies the input data value to comparators of the stages in parallel, and the comparators substantially simultaneously determine whether the input data value is greater than stored data values stored in respective registers of the stages.

9. The sorting circuit of claim 1, wherein the input circuit includes a threshold filter to prevent data values in the sequence of data values that fail to pass the threshold filter from being supplied to the stages.

10. The sorting circuit of claim 1, wherein the individual ones of the stages further include:
an AND gate to control the multiplexer to:
select the replacement data value as the next-highest stored data value when the comparator determines that the input data value is greater than the stored data value and the comparator of the next-highest stage determines that the input data value is greater than the next-highest stored data value; or
select the replacement data value as the input data value when the comparator determines that the input data value is greater than the stored data value and the comparator of the next-highest stage determines that the input data value is not greater than the next-highest stored data value.

11. The sorting circuit of claim 1, wherein the individual ones of the stages further include:
an OR gate to control enabling of the register to store the replacement data value when either the comparator determines that the input data value is greater than the stored data value or the comparator of the next-highest stage determines that the input data value is greater than the next-highest stored data value.

12. The sorting circuit of claim 1, wherein the sequence of data values is received by the input circuit in real time, and the sorting circuit performs a sort operation on data values in the sequence of data values in real time.

13. The sorting circuit of claim 1, wherein the input data value and the stored data value are represented as binary digits or decimal digits.

14. The sorting circuit of claim 1, further comprising:
holding registers respectively corresponding to the stages, wherein stored data values in the registers of the stages are stored in the holding registers in response to a new sort signal that indicates a beginning of a new sorting time interval.

15. A sorting circuit, comprising:
a stack of registers to store a set of stored data values from a highest value to a lowest value;
comparators to substantially simultaneously compare an input data value to the set of stored data values stored in the registers, the comparators enabling registers whose stored data values are less than the input data value to receive a replacement data value;
multiplexers, each multiplexer being associated with an associated register in the stack of registers to select the replacement data value for the associated register when the associated register is enabled, the multiplexer selecting the input data value as the replacement data value if the associated register is a highest register in the stack of registers currently storing a stored data value that is less than the input data value, the multiplexer otherwise selecting as the replacement data value a data value stored in a next-highest register in the stack of registers; and
OR gates, each OR gate being associated with an associated register in the stack of registers to control enabling of the associated register to store the replacement data value when either a comparator associated with the associated register determines that the input data value is greater than the stored data value stored by the associated register or a comparator associated with the next-highest register in the stack of registers determines that the input data value is greater than the stored data value stored in the next-highest register in the stack of registers,
wherein propagation delays associated with determining replacement data values throughout the stack of registers are sufficiently short to enable the input data value to be sorted into the set of stored data values in a single clock cycle of the sorting circuit.

16. The sorting circuit of claim 15, further comprising:
an input circuit to receive a clock signal and a sequence of input data values, the input circuit supplying one of the input data values to the comparators and the multiplexers in each cycle of the clock signal.

17. The sorting circuit of claim 16, wherein the sequence of input data values is received by the input circuit in real time, and the sorting circuit performs a sort operation on the input data values in the sequence in real time.

18. The sorting circuit of claim 15, wherein no more than a single gate delay results from propagating selection of the replacement data value from one register to a next-lowest register in the stack of registers.

19. A method of sorting an input data value into a set of stored data values in a single clock cycle of a sorting circuit, the method comprising:
within the single clock cycle:
substantially simultaneously comparing the input data value to a set of stored data values respectively stored in a stack of registers from a highest value stored in a highest register to a lowest value stored in a lowest register;
storing the input data value and a descriptor indicating a characteristic of the input data value in an insertion register in the stack of registers, the insertion register being a highest register in the stack of registers that had been storing a stored data value determined to be less than the input data value; and
for registers lower in the stack of registers than the insertion register, storing a data value that had been stored in a next-highest register in the stack of registers, such that stored data values less than the input data value are shifted down one register in the stack of registers.

20. The method of claim 19, further comprising:
threshold filtering a sequence of data values to prevent data values in the sequence of data values that fail to pass a threshold from being sorted into the set of stored data values.

\* \* \* \* \*